(12) United States Patent
Kawata et al.

(10) Patent No.: US 10,120,966 B2
(45) Date of Patent: Nov. 6, 2018

(54) INFORMATION PROCESSING DEVICE AND WAVEFORM VERIFICATION METHOD

(71) Applicant: FUJITSU LIMITED, Kawasaki-shi, Kanagawa (JP)

(72) Inventors: Hikoyuki Kawata, Kawasaki (JP); Masaki Tosaka, Kawasaki (JP); Kumiko Teramae, Setagaya (JP)

(73) Assignee: FUJITSU LIMITED, Kawasaki (JP)

( * ) Notice: Subject to any disclaimer, the term of this patent is extended or adjusted under 35 U.S.C. 154(b) by 302 days.

(21) Appl. No.: 15/087,091

(22) Filed: Mar. 31, 2016

(65) Prior Publication Data

US 2016/0334460 A1  Nov. 17, 2016

(30) Foreign Application Priority Data

May 14, 2015  (JP) ................. 2015-098818

(51) Int. Cl.
  *G01R 31/36* (2006.01)
  *G06F 17/50* (2006.01)

(52) U.S. Cl.
  CPC ...... *G06F 17/5036* (2013.01); *G06F 2217/82* (2013.01)

(58) Field of Classification Search
  CPC ...... G01R 23/02; G01R 19/2513; G06F 17/00
  USPC .............. 702/124, 70, 74, 75, 190
  See application file for complete search history.

(56) References Cited

U.S. PATENT DOCUMENTS

| 7,072,781 B1* | 7/2006 | Gershon | G01R 31/31908 324/426 |
| 2006/0047494 A1* | 3/2006 | Tamura | G06F 17/5036 703/19 |
| 2010/0057423 A1* | 3/2010 | Tsubamoto | G06F 17/5036 703/13 |

FOREIGN PATENT DOCUMENTS

| EP | 1083502 A1 | 3/2001 |
| JP | 2000-35984 | 2/2000 |
| JP | 2004-259001 | 9/2004 |

* cited by examiner

*Primary Examiner* — Jonathan Han
(74) *Attorney, Agent, or Firm* — Staas & Halsey LLP

(57) ABSTRACT

An information processing device include: a memory; and one or more processors which are coupled to the memory, wherein the one or more processors performs a process including verifying a quality of a signal waveform that is propagated through focused wiring on a substrate; and storing information which is used for the verification of the quality of the signal waveform, and wherein the verifying includes determining a relative permittivity of the substrate in a division position of a variation range of the relative permittivity of the substrate such that a variation range of a propagation delay time of the signal waveform corresponding to the variation range of the relative permittivity of the substrate is divided at even intervals; generating an analysis model corresponding to the relative permittivity of the substrate in the determined division position; and performing waveform analysis on the signal waveform using the generated analysis model.

15 Claims, 13 Drawing Sheets

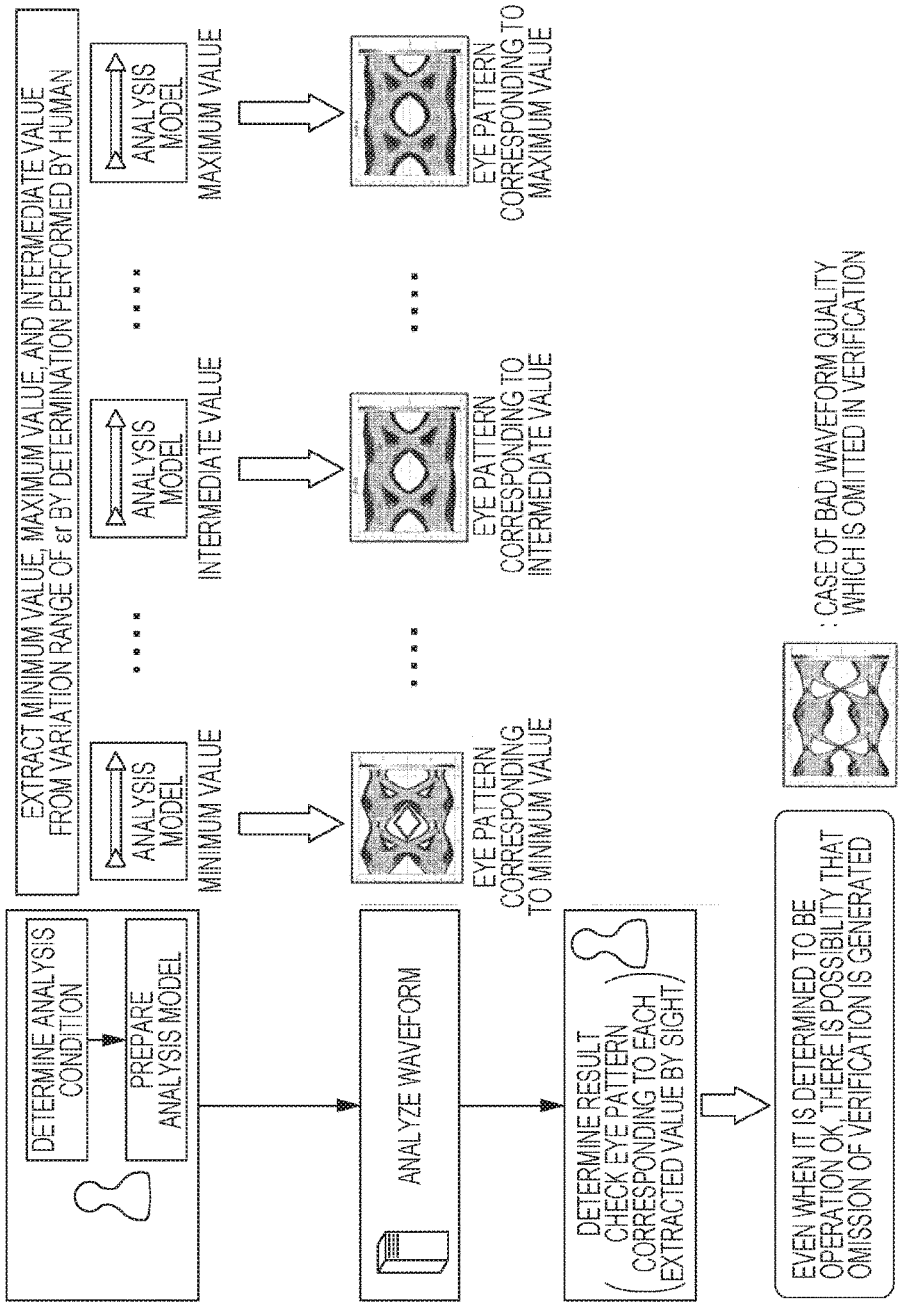

INFORMATION PROCESSING DEVICE AND WAVEFORM VERIFICATION METHOD

CROSS-REFERENCE TO RELATED APPLICATION

This application is based upon and claims the benefit of priority of the prior Japanese Patent Application No. 2015-098818, filed on May 14, 2015, the entire contents of which are incorporated herein by reference.

FIELD

The embodiment discussed herein is related to an information processing device and a waveform verification method.

BACKGROUND

In recent years, with high data transmission speed which is desired for various electronic apparatuses, high-speed serial transmission, such as Peripheral Component Interconnect (PCI)-Express or Universal Serial Bus (USB) 3.0, has become widespread. In the high-speed serial transmission, a subsequent signal is changed and transmitted before the level of the signal becomes stable, in order to transmit a signal by high speed.

In contrast, on a transmission line through which a signal is propagation, reflective noise is generated in a spot at which the characteristic impedance is discontinuous. The reflective noise arrives at a reception terminal while being repeatedly reflected, thereby having a negative influence on the quality of a received signal waveform (received waveform). In addition, if a variation occurs on a relative permittivity of a substrate due to a substrate production variation, a propagation delay time (substrate delay time) of an electrical signal, which passes through a transmission line within the substrate changes for each substrate. If the propagation delay time changes, reflective noise arrival timing at the reception terminal changes, and thus a signal waveform which is received in the reception terminal changes for each substrate.

In this manner, even in a case of a substrate of the same design, reflective noise arrival timing changes due to the substrate production variation, and thus a phenomenon, in which the quality of the received waveform changes for each substrate, is generated. Specifically, if the transmission speed (transmission rate) exceeds 10 Gbps and rises to 28 Gbps or 56 Gbps, a percentage of difference of reflective noise arrival timing to a bit width increases, and thus reflective noise arrival timing largely changes, even due to slight change in the relative permittivity. For this reason, according to the reflective noise arrival timing, the degree of deterioration in a quality of the received waveform largely changes, and thus a problem of the reflective noise is revealed.

In an actual machine, it is difficult to control variation, and thus it is difficult to verify, in detail, a phenomenon which is caused by the above-described production variation, in the actual machine. Therefore, it is desired to develop a technology of verifying the quality of the received waveform based on substrate production variation using high-speed digital signal transmission simulation.

Japanese Laid-open Patent Publication No. 2004-259001 and Japanese Laid-open Patent Publication No. 2000-035984 are examples of the related art.

As described above, the degree to which the substrate production variation influences the quality of the signal waveform is based on the reflective noise arrival timing. For this reason, the degree has no regularity and it is difficult to detect the worst case of the quality of the signal waveform.

Here, in a verification method in a general Printed Circuit Board (PCB) design flow, two types of analysis models are generated for a minimum value and a maximum value of a variation range of a relative permittivity of a substrate in accordance with production variation, and the signal waveform is verified using the two types of generated analysis models. Furthermore, at least one arbitrary relative permittivity (intermediate value) is manually extracted within the variation range of the relative permittivity, analysis models are generated for extracted one or more relative permittivities, and signal waveforms are verified using the one or more generated analysis models.

At this time, in a case in which a ratio of time difference (delay difference) of the reflective noise arrival timing to the bit width is low, that is, in a case in which the transmission rate is low, it is difficult for a problem of the reflective noise to occur, even when the above-described analysis method is used, and thus the influence of time difference of the reflective noise arrival timing may not be considered.

However, if the transmission rate is high, the shape of the signal waveform largely changes even due to slight delay difference, and thus there is a large influence on the quality of the signal waveform. For this reason, it is desirable to perform design by taking the substrate production variation into consideration. However, when the verification target case is manually extracted, the omission of verification of a malfunction case occurs, and thus there is a possibility that failures occur in the actual machine. In addition, even though the number of cases which are extracted within the variation range increases, there is a case in which it is difficult to avoid verification omission in a design condition such as a wiring length or a transmission speed.

According to an aspect, an object of the embodiment disclosed in the specification is to verify a deterioration case of a quality of a signal waveform caused by a substrate production variation without omission.

SUMMARY

According to an aspect of the invention, an information processing device include: a memory; and one or more processors which are coupled to the memory, wherein the one or more processors performs a process including verifying a quality of a signal waveform that is propagated through focused wiring on a substrate; and storing information which is used for the verification of the quality of the signal waveform, and wherein the verifying includes determining a relative permittivity of the substrate in a division position of a variation range of the relative permittivity of the substrate such that a variation range of a propagation delay time of the signal waveform corresponding to the variation range of the relative permittivity of the substrate is divided at even intervals; generating an analysis model corresponding to the relative permittivity of the substrate in the determined division position; and performing waveform analysis on the signal waveform using the generated analysis model.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 12 is a diagram illustrating a verification procedure and a problem in a general PCB design flow.

DESCRIPTION OF EMBODIMENTS

Figure 1:
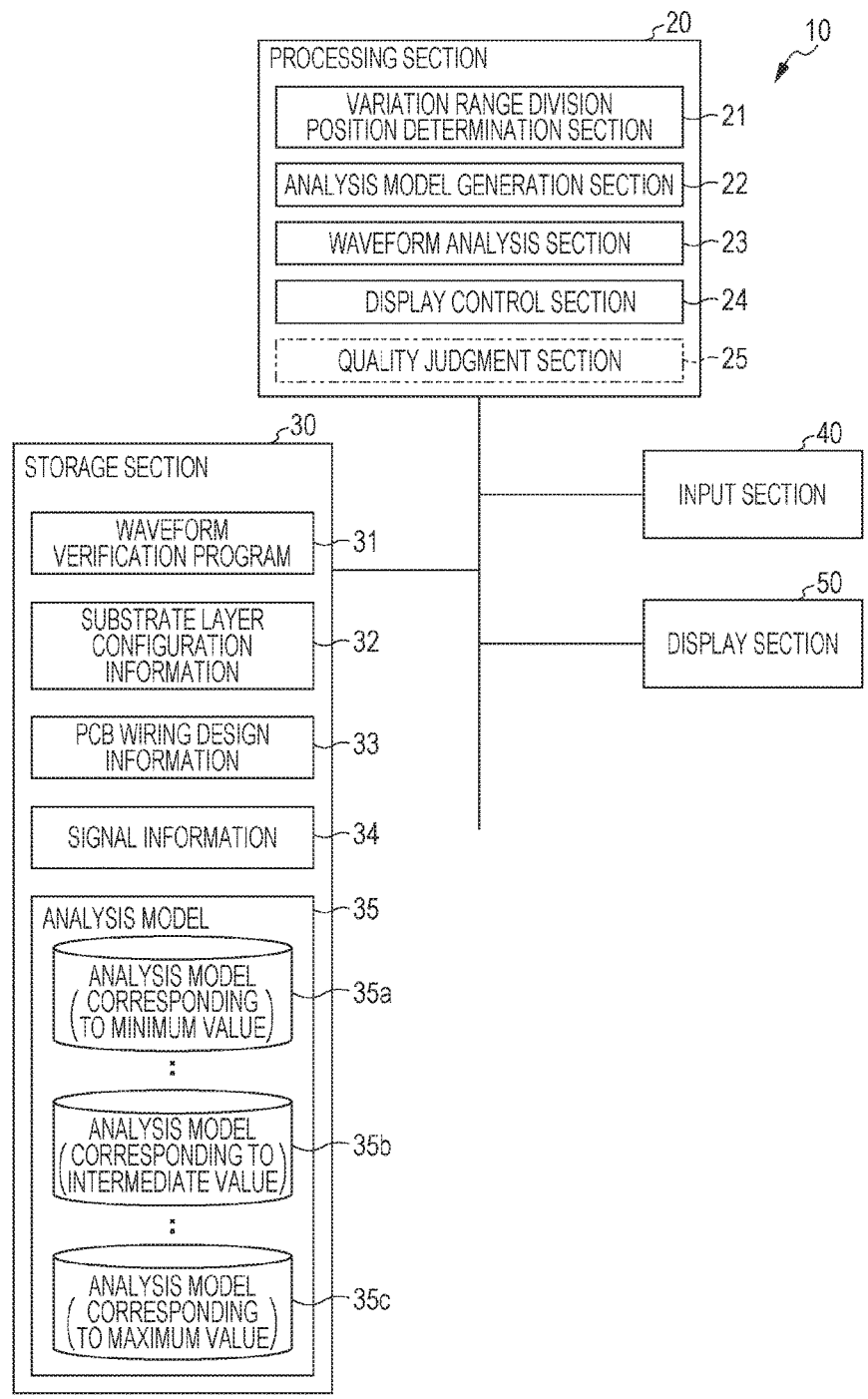
FIG. 1 is a block diagram illustrating an example of a functional configuration of an information processing device which has a waveform verification function according to an embodiment.

Hereinafter, an embodiment of a waveform verification program, an information processing device, and a waveform verification method, which are disclosed in the specification, will be described in detail with reference to the accompanying drawings. However, embodiments described below are only examples, and it is not intended to exclude application of various modified examples and technologies which are not described in the embodiments. That is, it is possible to modify and realize the embodiments in various ways without departing from the gist thereof. In addition, each drawing can include not only configuration elements illustrated in the drawing but also other functions. Further, it is possible to appropriately combine the respective embodiments without contradicting process content.

Figure 8A:
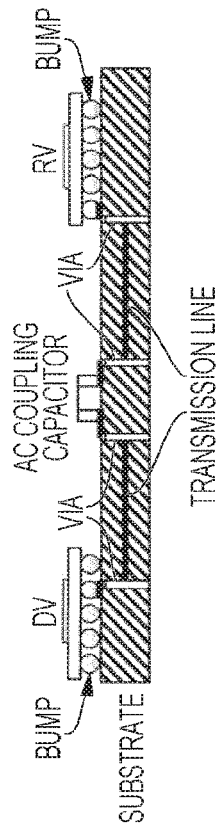
FIG. 8A is a longitudinal sectional diagram schematically illustrating a substrate which includes a high-speed SERializer/DESerializer (SERDES) that performs high-speed serial transmission.
Figure 8B:
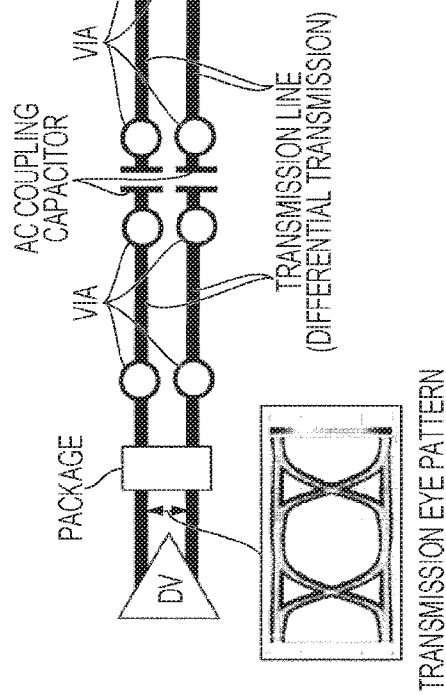
FIG. 8B is a diagram illustrating an equivalent circuit of the high-speed SERDES illustrated in FIG. 8A and an example of a sending eye pattern and a receiving eye pattern in the high-speed SERDES.
Figure 8C:
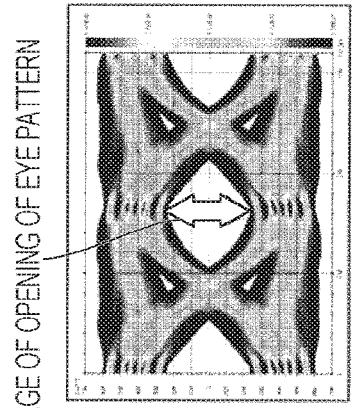
FIG. 8C is a diagram illustrating the enlarged receiving eye pattern illustrated in FIG. 8B in order to describe a signal quality judgment reference.

A technology which is the premise of the embodiment will be described with reference to FIGS. 8A to 13B. First, a configuration or the like of a substrate, which is a waveform verification target in the embodiment and includes a high-speed SERDES (serial/parallel mutual conversion circuit) that performs high-speed serial transmission, will be described with reference to FIGS. 8A to 8C. Here, FIG. 8A is a longitudinal sectional diagram schematically illustrating a substrate which includes a high-speed SERDES that performs high-speed serial transmission. FIG. 8B is a diagram illustrating an equivalent circuit of the high-speed SERDES illustrated in FIG. 8A and examples of a sending eye pattern and a receiving eye pattern in the high-speed SERDES. FIG. 8C is an enlarged diagram illustrating the receiving eye pattern illustrated in FIG. 8B in order to describe a signal quality judgment reference.

In the substrate which includes the high-speed SERDES that performs the high-speed serial transmission, for example, a driver element (DV) is connected to a receiver element (RV) through bumps, vias, transmission lines, Alternating Current (AC) coupling capacitors, and the like, as illustrated in FIG. 8A. Specifically, as illustrated in FIG. 8B, a signal is transmitted from the DV to the RV by differential transmission through a pair of vias, a pair of transmission lines, a pair of AC coupling capacitors, and the like.

Meanwhile, in FIG. 8B, a package includes the bumps, a chip substrate of the DV or the RV, and the like. The substrate is, for example, a Printed Circuit Board (PCB). The transmission lines, through which the signal is propagated, are wired within the substrate. The transmission lines are connected to various elements DV and RV which are arranged on the surface of the substrate through vias, wiring patterns, and bumps.

In the high-speed SERDES, an electrical signal is transmitted from the DV to the RV by several Gbps to several+ Gbps. At this time, the electrical signal, which is transmitted on the substrate, is deteriorated due to transmission loss on the transmission line, reflective noise which is generated in the vias and the package, and the like. For example, as illustrated in FIG. 8B, with regard to a sending eye pattern for a signal which is acquired immediately after being sent from the DV, a receiving eye pattern which is acquired immediately before being received in the RV is deteriorated. The sending eye pattern and the receiving eye pattern are acquired by waveform analysis (transition analysis).

A user can judge a quality of a waveform as below by referring to the receiving eye pattern as illustrated in FIGS. 8B and 8C.

In the eye pattern, if a plurality of waveforms are not varied and the waveforms are superimposed on the same position (the same timing), the width of the waveforms which form an eye pattern is narrow, and the eye pattern enters a state in which a central space (the shape of the inside of the eye pattern; opening) is vertically open widely. That is, an opening voltage of the eye pattern as illustrated in FIG. 8C is high. In a case in which the opening voltage is high, it is judged that the quality of a signal waveform of a judgment target is excellent.

In contrast, in the eye pattern, a plurality of waveforms are varied and the positions (timing) of the waveforms are deviated, the width of the waveforms which form the eye pattern is thick, and the eye pattern enters a state in which the opening is close. That is, the opening voltage of the eye pattern as illustrated in FIG. 8C is low. In a case in which the opening voltage is low, it is judged that the quality of the signal waveform of the judgment target is bad.

However, as described above, if a variation is generated in a relative permittivity ∈r of the substrate due to a substrate production variation, a propagation delay time Td of an electrical signal which passes through a transmission line within the substrate changes for each substrate. A propagation delay time Td of an electrical signal in a case in which the relative permittivity is ∈r is given in equation (1). Where, $\mu_0$ is a vacuum magnetic permeability and $\in_0$ is a vacuum permeability.

$$Td=\sqrt{\mu_0 \in r} \quad (1)$$

Figure 9A:
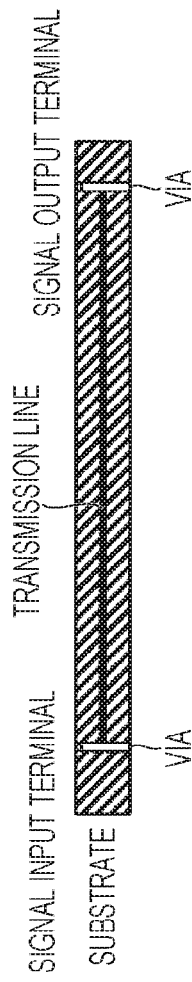
FIGS. 9A and 9B are diagrams illustrating the relationship between the relative permittivity and the propagation delay time of the substrate.
Figure 9B:
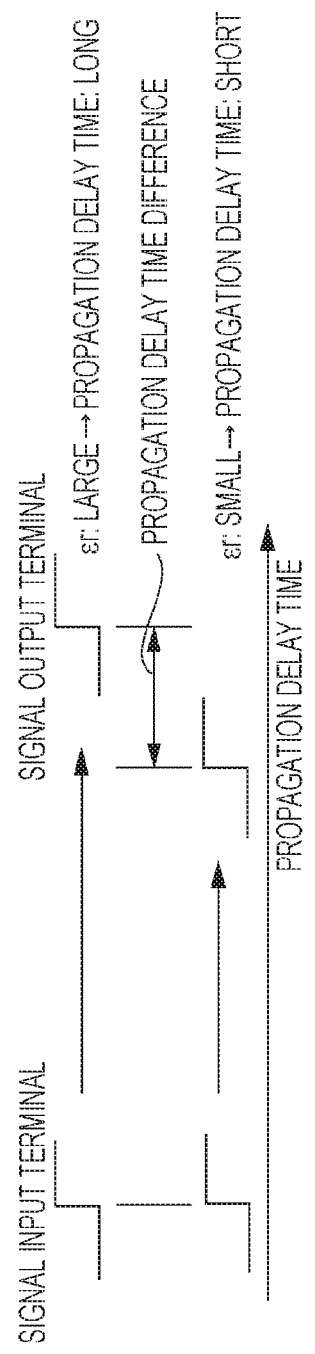

Therefore, if the relative permittivity ∈r (dielectric substance) of the substrate varies due to the substrate production variation, the propagation delay time Td of the electrical signal varies. Here, the relationship between the relative permittivity ∈r and the propagation delay time Td of the substrate will be described with reference to FIGS. 9A and 9B. As illustrated in FIG. 9A, in a case in which the electrical signal is transmitted from a via on a signal input terminal side to a via on a signal output terminal side through a transmission line within a substrate, the propagation delay time from the via on the signal input terminal side to the via on the signal output terminal side becomes long as the relative permittivity ∈r of the substrate is high, as illustrated in FIG. 9B. In contrast, as the relative permittivity ∈r of the substrate is low, the propagation delay time from the via on the signal input terminal side to the via on the signal output terminal side becomes short. For this reason, if the variation range of the relative permittivity ∈r of the substrate is large, the variation range (difference in size; difference in the propagation delay time) of the propagation delay time becomes large. Hereinafter, there is a case in which a propagation delay time variation is referred to as a substrate delay variation.

Figure 10A:
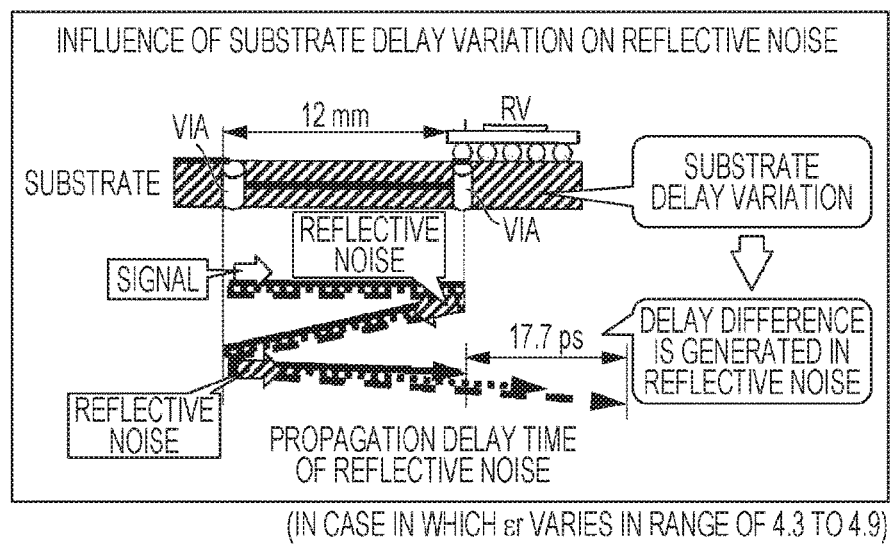
FIG. 10A is a diagram illustrating an influence of substrate delay variation on reflective noise.
Figure 10B:
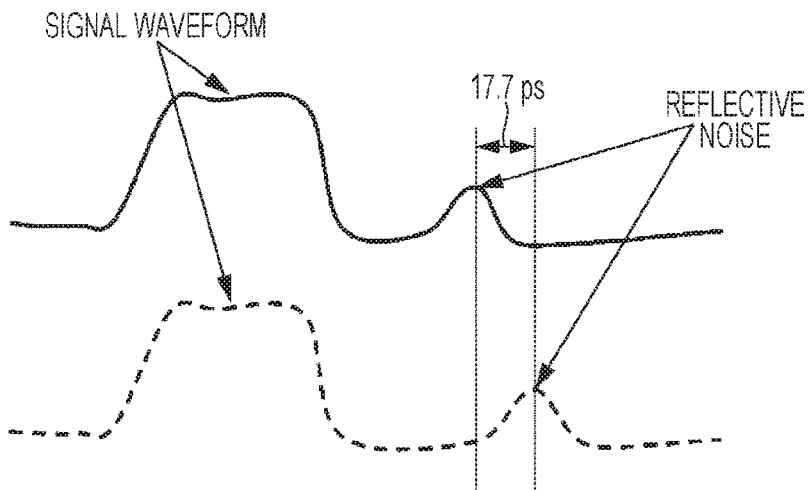
FIG. 10B is a waveform diagram illustrating a signal waveform and the reflective noise corresponding to an example illustrated in FIG. 10A.

As above, if the substrate delay variation occurs, a timing in which reflective noise arrives at the signal output terminal changes, and thus a signal waveform, which arrives at the signal output terminal, changes for each substrate. Here, an influence of the substrate delay variation on the reflective noise will be described with reference to FIGS. 10A, 10B, and 11. Meanwhile, FIG. 10A is a diagram illustrating the influence of the substrate delay variation on the reflective noise, FIG. 10B is a waveform diagram illustrating a signal waveform and the reflective noise corresponding to an example illustrated in FIG. 10A. In addition, FIG. 11 is a flowchart illustrating a principle of the influence of the substrate delay variation on the received waveform (step A1 to A4).

Figure 11:
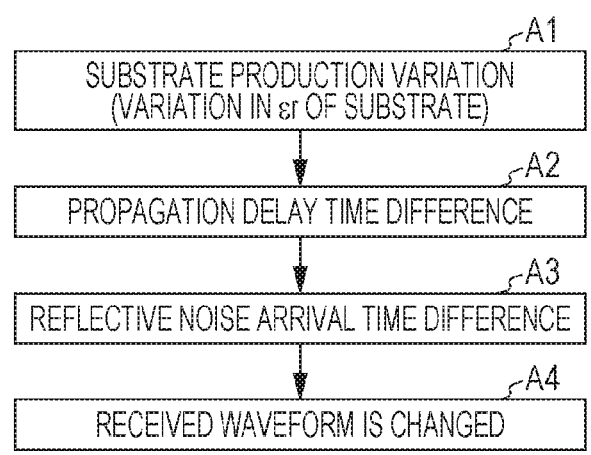
FIG. 11 is a flowchart illustrating a principle of the influence of the substrate delay variation on a received waveform.

As illustrated in FIG. 10A, if the substrate production variation (variation in the relative permittivity ∈r of the substrate) occurs (refer to step A1 of FIG. 11), a propagation delay time difference, that is, a substrate delay variation occurs (refer to step A2 of FIG. 11). If the substrate delay variation occurs, a reflective noise arrival time difference (delay difference) occurs (refer to step A3 of FIG. 11), and a received waveform in the RV changes (refer to step A4 of FIG. 11) as illustrated in FIG. 10B.

For example, in a case in which a wiring length from the via on the signal input terminal side to the via on the signal output terminal side is 12 mm and the relative permittivity ∈r of the substrate varies in a range of 4.3 to 4.9 as illustrated in FIG. 10A, an arrival time difference (delay difference) of 17.7 ps (picosecond) is generated in the reflective noise as illustrated in FIGS. 10A and 10B. Meanwhile, signals (reflective noise) which are indicated by a solid line arrow and a broken line arrow in FIG. 10A respectively correspond to signal waveforms which are indicated by a solid line and a broken line in FIG. 10B.

As described above, a degree, in which the substrate production variation affects the quality of the signal waveform, largely changes according to the reflective noise arrival timing, and thus a problem of the reflective noise is actualized. However, it is difficult to control the variation in an actual machine, and thus it is difficult to verify a phenomenon caused by the production variation as described above in detail in the actual machine. Therefore, it is desired to develop a technology of verifying the quality of the received waveform based on the substrate production variation using high-speed digital signal transmission simulation.

In a verification method in a general PCB design flow, an analysis condition is determined in such a way that a minimum value, a maximum value and at least one arbitrary relative permittivity (intermediate value) are extracted from a variation range of the relative permittivity ∈r of the substrate based on the determination of the user, as illustrated in FIG. 12. Further, analysis models are prepared for the respective extracted values, waveform analysis is performed on the respective analysis models, and eye patterns corresponding to the respective values are acquired. Thereafter, the eye patterns corresponding to the respective extracted values are checked by sight of the user or the like.

Figure 13A:
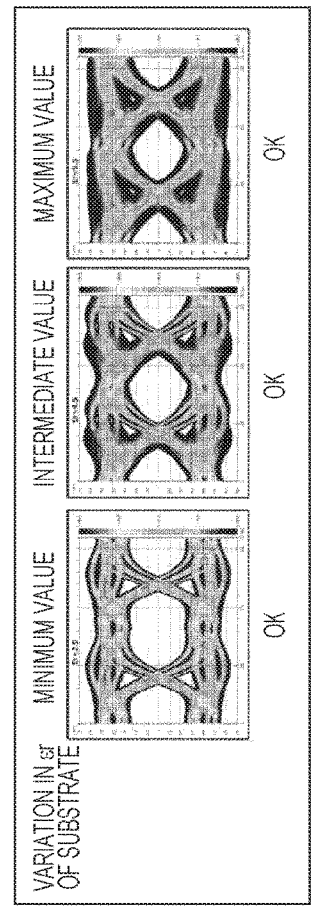
FIG. 13A is a diagram illustrating an example in which verification is performed by extracting a minimum value, a maximum value, and one intermediate value from a substrate relative permittivity variation range.
Figure 13B:
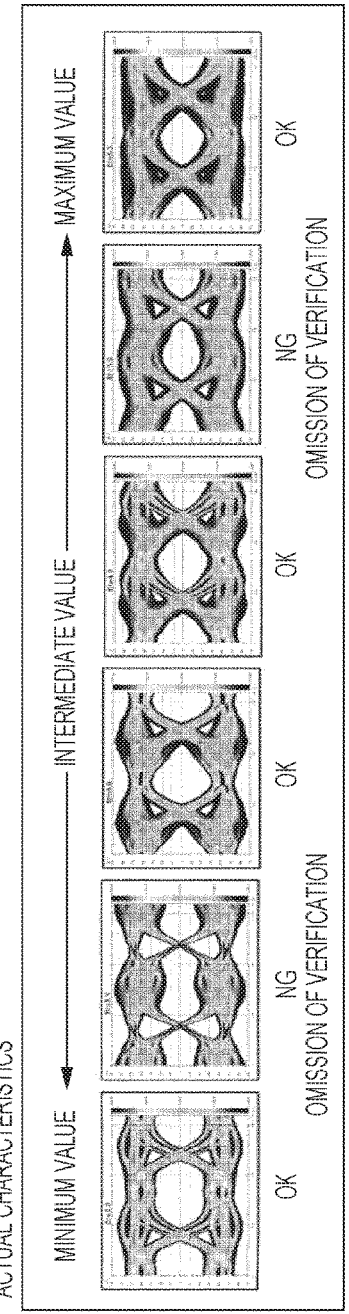
FIG. 13B is a diagram illustrating actual characteristics which include a waveform quality deterioration case which is omitted from the verification example illustrated in FIG. 13A.

At this time, even when it is judged as operation OK for at least three eye patterns by sight check as illustrated in FIGS. 12 and 13A, there is a possibility that verification omission, in which characteristics of an improper operation (NG) are missed, occurs as illustrated in FIG. 13B. Meanwhile, FIG. 12 is a diagram illustrating a verification procedure and a problem in a general PCB design flow. In addition, FIG. 13A is a diagram illustrating an example (receiving eye pattern) in which verification is performed by extracting the minimum value, the maximum value, and one intermediate value from the variation range of the relative permittivity ∈r of the substrate. Further, FIG. 13B is a diagram illustrating actual characteristics (receiving eye patterns) which include a waveform quality deterioration case which is omitted from the verification example illustrated in FIG. 13A.

Specifically, if a transmission rate is high, the shape of the signal waveform largely changes even though time difference (delay difference) in the reflective noise arrival timing is small, and thus the influence on the quality of the signal waveform is large. For this reason, although it is desired to perform design by taking the substrate production variation into consideration, verification omission occurs in manual extraction of the verification target case as illustrated in FIG. 13B, and thus there is a possibility that failures occur in the actual machine. In addition, even though the number of cases extracted from a variation range is increased, there is a case in which it is difficult to avoid the occurrence of the verification omission according to a design condition such as a wiring length or a transmission speed.

Here, in the embodiment, there is provided a method of verifying reflective noise attributable to the substrate delay variation (variation in propagation delay time Td) in order to perform verification without omitting a signal waveform quality deterioration case caused by the substrate production variation by reducing the verification omission as illustrated in FIG. 13B as far as possible.

Figure 6:
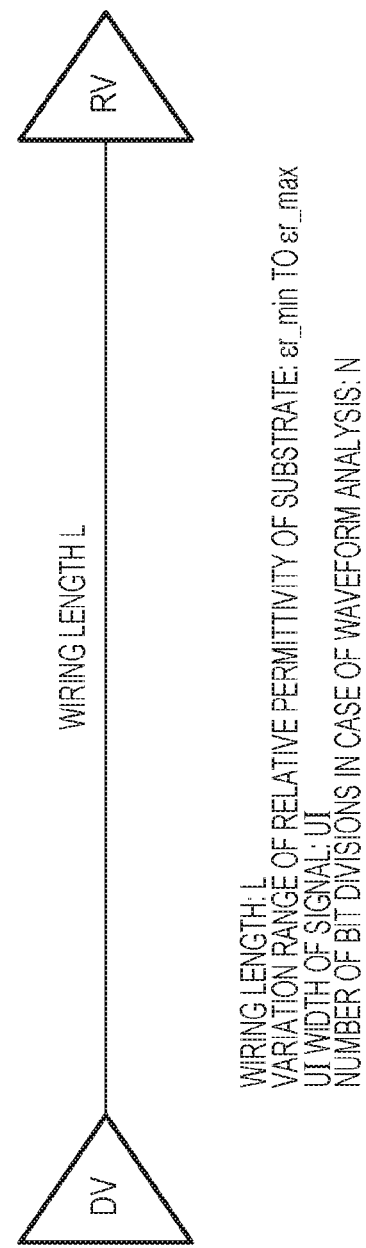
FIG. 6 is a diagram illustrating a method of determining the division position of the variation range according to the embodiment.
Figure 7:
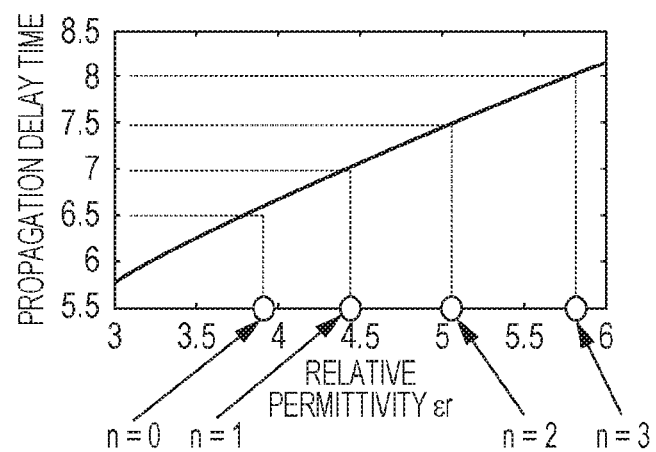
FIG. 7 is a graph illustrating the relationship between a division position at a relative permittivity and a division position at propagation delay time in the embodiment.

Subsequently, overview of the embodiment will be described with reference to FIGS. 6 and 7. Meanwhile, FIG. 6 is a diagram illustrating a method of determining the division position (notch) of the variation range according to the embodiment. FIG. 7 is a graph illustrating the relationship between a division position (notch) at the relative permittivity ∈r and the division position (notch and delay difference) at the propagation delay time Td in the embodiment.

In the embodiment, a value of the relative permittivity ∈r of the substrate in the division position of the variation range of the relative permittivity ∈r of the substrate is determined such that the variation range of the propagation delay time Td of the signal waveform, which corresponds to the variation range of the relative permittivity ∈r of the substrate, is divided at even intervals (refer to FIG. 7). Further, an analysis model corresponding to the value of the relative permittivity ∈r of the substrate in the determined division position is generated, and signal waveform analysis is performed using the generated analysis model, thereby acquiring the eye pattern.

Hereinafter, a method of determining the division position (notch) of the variation range (substrate delay variation range) of the propagation delay time Td of the signal waveform according to the embodiment will be described.

In the embodiment, two items (a1) and (a2) below are set as determination conditions of the division position (notch) of the variation range of the propagation delay time Td, and an analysis condition of an optimal substrate delay variation which satisfies the two items (a1) and (a2) is determined.

(a1) Reduce the possibility of the verification omission as far as possible (a2) Non-excessive precision in which the delay difference (notch) attributable to the substrate delay variation exceeds the analysis precision (time interval between analysis steps; analysis notch) in a case of the waveform analysis (in a case of the waveform simulation)

Here, as illustrated in FIG. 6, a wiring, which has a wiring length L from the driver element DV to the receiver element RV on the substrate, is set to a focused wiring. The vias, the packages, the transmission lines, the AC coupling capacitors, and the like, which are illustrated in FIG. 8B, are present on the focused wiring.

In addition, as illustrated in FIG. 6, it is assumed that the variation range of the relative permittivity ∈r of the substrate is in a range of ∈r_min (minimum value) to ∈r_max (maximum value), the unit interval (UI) width of a signal is UI, and the number of divisions performed on bits (the number of divisions performed on the UI width) in a case of the waveform analysis is N. Meanwhile, a value of the UI corresponds to time of one bit length (inverse number of a bit rate) of a data signal. In addition, a value of N is determined according to a model (specification) of a device such as a driver element DV or a receiver element RV.

Further, it is assumed that the relative permittivity of the substrate in an n-th (n is an integer which is equal to or greater than 0) variation case (division position) is ∈r(n). In addition, it is assumed that the relative permittivity of a (n+1)-th variation case (division position) to be analyzed subsequent to the n-th variation case, in which the relative permittivity is ∈r(n), is ∈r(n+1). Further, when it is assumed that the propagation delay time of the n-th variation case is $Td_1$ and the propagation delay time of the (n+1)-th variation case is $Td_2$, propagation delay times $Td_1$ and $Td_2$ are respectively given by equations (2) and (3) below based on equation (1).

$$Td_1 = L\sqrt{\mu_0 \epsilon_0 \epsilon r(n)} \qquad (2)$$

$$Td_2 = L\sqrt{\mu_0 \epsilon_0 \epsilon r(n)+1} \qquad (3)$$

Therefore, if it is assumed that the delay difference attributable to the substrate delay variation is $Td_{diff}$, the delay difference $Td_{diff}$ is given by equation (4) below.

$$Td_{diff} = Td_2 - Td_1 = L\sqrt{\mu_0 \epsilon_0 \epsilon r(n)+1} - L\sqrt{\mu_0 \epsilon_0 \epsilon r(n)} \qquad (4)$$

At this time, the condition (a1) corresponds a fact that the delay difference $Td_{diff}$ which is given by equation (4) above is small as far as possible, and the condition (a2) corresponds to a fact that "delay difference $Td_{diff}$ attributable to the substrate delay variation analysis notch UI/N in a case of the waveform analysis". For this reason, an optimal analysis condition which satisfies the conditions (a1) and (a2) is that "delay difference $Td_{diff}$ attributable to the substrate delay variation=analysis notch UI/N in the case of the waveform analysis".

If equation (4) substitute for the condition "$Td_{diff}$=UI/N" and equation is changed like equations (5) to (8) below, the relative permittivity ∈r(n+1) of the (n+1)-th variation case (division position) is given as equation (8) below. Meanwhile, in equations (5) to (7) below, ∈r1=∈r(n) and ∈r2=∈r(n+1).

$$L\sqrt{\mu_0 \epsilon_0 \epsilon r2} - L\sqrt{\mu_0 \epsilon_0 \epsilon r1} = \frac{UI}{N} \qquad (5)$$

$$\sqrt{\epsilon r2} - \sqrt{\epsilon r1} = \frac{UI}{NL\sqrt{\mu_0 \epsilon_0}} \qquad (6)$$

$$\sqrt{\epsilon r2} = \frac{UI}{NL\sqrt{\mu_0 \epsilon_0}} + \sqrt{\epsilon r1} \qquad (7)$$

$$\epsilon r(n+1) = \left(\frac{UI}{N \times L\sqrt{\mu_0 \epsilon_0}} + \sqrt{\epsilon r(n)}\right)^2 \qquad (8)$$

When a relative permittivity ∈r(0) of n=0, that is, a 0-th variation case is set to the minimum value ∈r_min of the substrate relative permittivity variation range like equation (9) below, the relative permittivity ∈r(n+1) of the (n+1)-th variation case is sequentially calculated and determined according to equation (8).

$$\epsilon r(0) = \epsilon r\_min \qquad (9)$$

In this manner, when the relative permittivities ∈r(0) to ∈r(n+1) of 0 to (n+1)-th variation cases (division positions) are determined, the variation range of the propagation delay time Td of the signal waveform corresponding to the variation range of the relative permittivity ∈r of the substrate is divided at even intervals base on time, as illustrated in FIG. 7. That is, in the embodiment, the variation range of the relative permittivity ∈r of the substrate is not simply divided at even intervals based on the relative permittivity. That is, the variation range of the relative permittivity ∈r of the substrate is divided such that the variation range of the propagation delay time Td of the signal waveform is divided at even intervals base on time.

Therefore, in the embodiment, it is possible to generate a variation analysis case, in which verification omission does not occur as far as possible, without the excessive precision in which the delay difference (notch) according to the substrate delay variation exceeds the analysis precision (analysis notch) acquired when the waveform analysis is performed.

Figure 2:
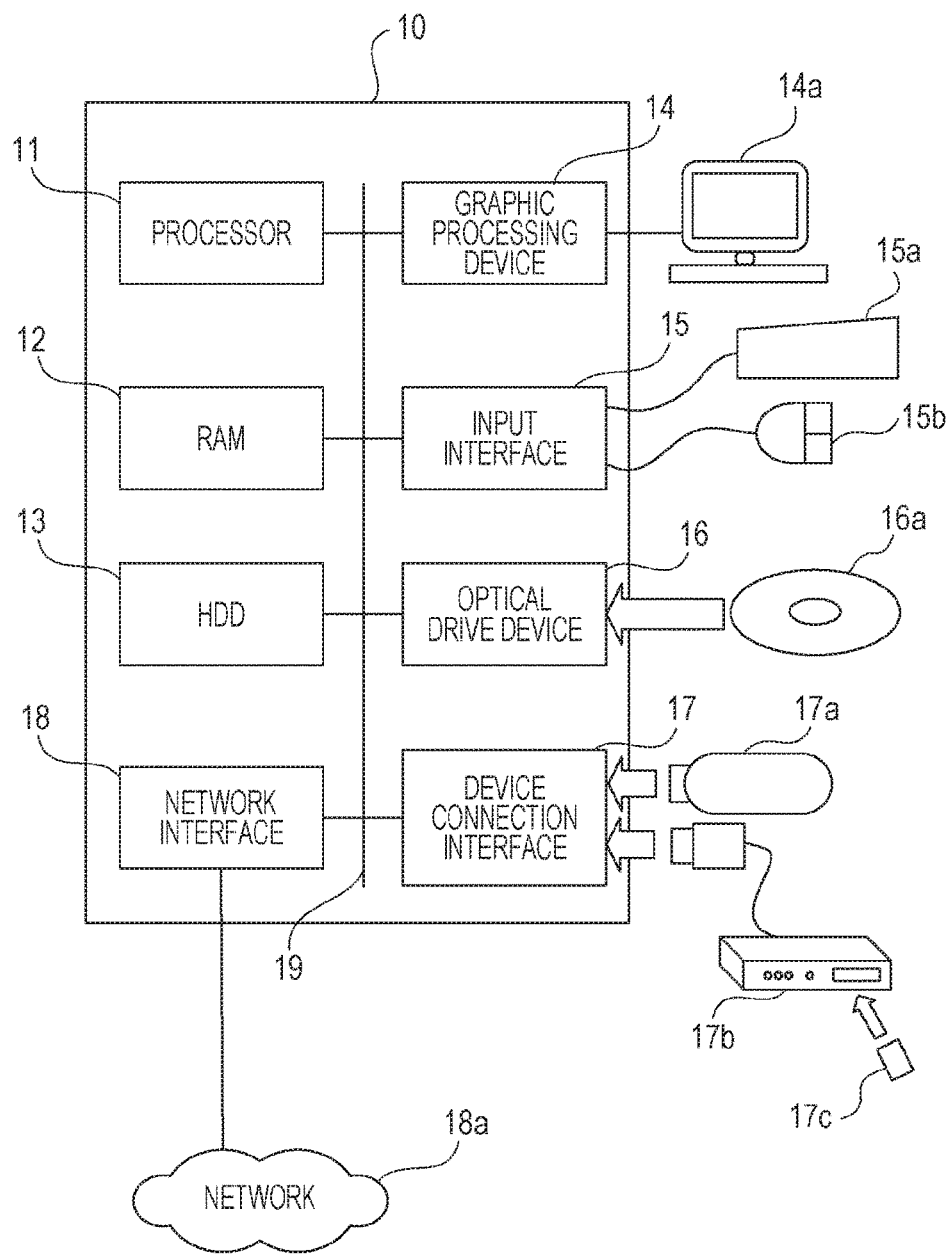
FIG. 2 is a block diagram illustrating an example of a hardware configuration of the information processing device which has the waveform verification function according to the embodiment.

A hardware configuration of an information processing device (computer) 10 which realizes a waveform verification function according to the embodiment will be described with reference to FIG. 2. FIG. 2 is a block diagram illustrating an example of the hardware configuration.

The computer 10 includes, for example, a processor 11, a Random Access Memory (RAM) 12, a Hard Disk Drive (HDD) 13, a graphic processing device 14, an input interface 15, an optical drive device 16, a device connection interface 17, and a network interface 18 as configuration elements. The configuration elements 11 to 18 are configured to be able to communicate with each other through a bus 19.

The processor (processing section) 11 controls the entire computer 10. The processor 11 may be a multi-processor. The processor 11 may be one of, for example, a Central Processing Unit (CPU), a Micro Processing Unit (MPU), a Digital Signal Processor (DSP), an Application Specific Integrated Circuit (ASIC), a Programmable Logic Device (PLD), and a Field Programmable Gate Array (FPGA). In addition, the processor 11 may be acquired by combining two or more types of elements of the CPU, the MPU, the DSP, the ASIC, the PLD, and the FPGA.

The RAM (storage section) 12 is used as a main memory of the computer 10. In the RAM 12, at least a part of an Operating System (OS) program and an application program which are executed in the processor 11 is temporarily stored. In addition, in the RAM 12, various data, which is desired for a process performed by the processor 11, is stored. The application program may include the waveform verification program (refer to reference numeral 31 of FIG. 1) which is executed by the processor 11 in order to realize the waveform verification function according to the embodiment by the computer 10.

The HDD (storage section) 13 magnetically writes and reads data onto and from an installed disk. The HDD 13 is used as an auxiliary memory of the computer 10. In the HDD 13, an OS program, an application program, and various data are stored. Meanwhile, it is possible to use a semiconductor memory (Solid State Drive (SSD)), such as a flash memory, as the auxiliary memory.

A monitor 14a is connected to the graphic processing device 14. The graphic processing device 14 displays an image on a screen of the monitor 14a according to a command from the processor 11. Examples of the monitor 14a include a display device using a Cathode Ray Tube (CRT), a liquid crystal display device, and the like.

A keyboard 15a and a mouse 15b are connected to the input interface 15. The input interface 15 sends signals, which are sent from the keyboard 15a and the mouse 15b, to the processor 11. Meanwhile, the mouse 15b is an example of a pointing device, and it is possible to use another pointing device. Examples of another pointing device include a touch panel, a tablet, a touch pad, a track ball, and the like.

The optical drive device 16 reads data which is recorded in an optical disk 16a using laser beams or the like. The optical disk 16a is a portable non-temporary recording medium in which data is recorded to be readable by reflection of light. Examples of the optical disk 16a include a Digital Versatile Disc (DVD), a DVD-RAM, a Compact Disc Read Only Memory (CD-ROM), a CD-Recordable (R)/ReWritable (RW), and the like.

The device connection interface 17 is a communication interface for connecting peripheral devices to the computer 10. For example, it is possible to connect a memory device 17a and a memory reader-writer 17b to the device connection interface 17. The memory device 17a is a non-temporary recording medium which has a communication function with the device connection interface 17, and is, for example, a Universal Serial Bus (USB) memory. The memory reader-writer 17b writes data onto a memory card 17c or reads data from a memory card 17c. The memory card 17c is a card-type non-temporary recording medium.

The network interface 18 is connected to a network 18a. The network interface 18 transmits or receives data to or from another computer or communication device through the network 18a.

It is possible to realize the waveform verification function, which will be described later with reference to FIG. 1 and FIGS. 3 to 5 according to the embodiment, by the computer 10 which has the above-described hardware configuration.

Meanwhile, the computer 10 realizes the waveform verification function according to the embodiment by executing a program (a waveform verification program) which is recorded in, for example, a computer-readable non-temporary recording medium. It is possible to record a program, which describes the content of a process to be executed in the computer 10, in various recording mediums. For example, it is possible to store a program which is executed by the computer 10 in the HDD 13. The processor 11 loads at least a part of the program in the HDD 13 to the RAM 12, and executes the loaded programs.

In addition, it is possible to record the program which is executed by the computer 10 (processor 11) in a non-temporary portable recording medium such as the optical disk 16a, the memory device 17a, or the memory card 17c. The program which is stored in the portable recording medium is executable after being installed in the HDD 13, for example, under the control of the processor 11. In addition, it is possible for the processor 11 to execute the program by directly reading the program from the portable recording medium.

Figure 3:
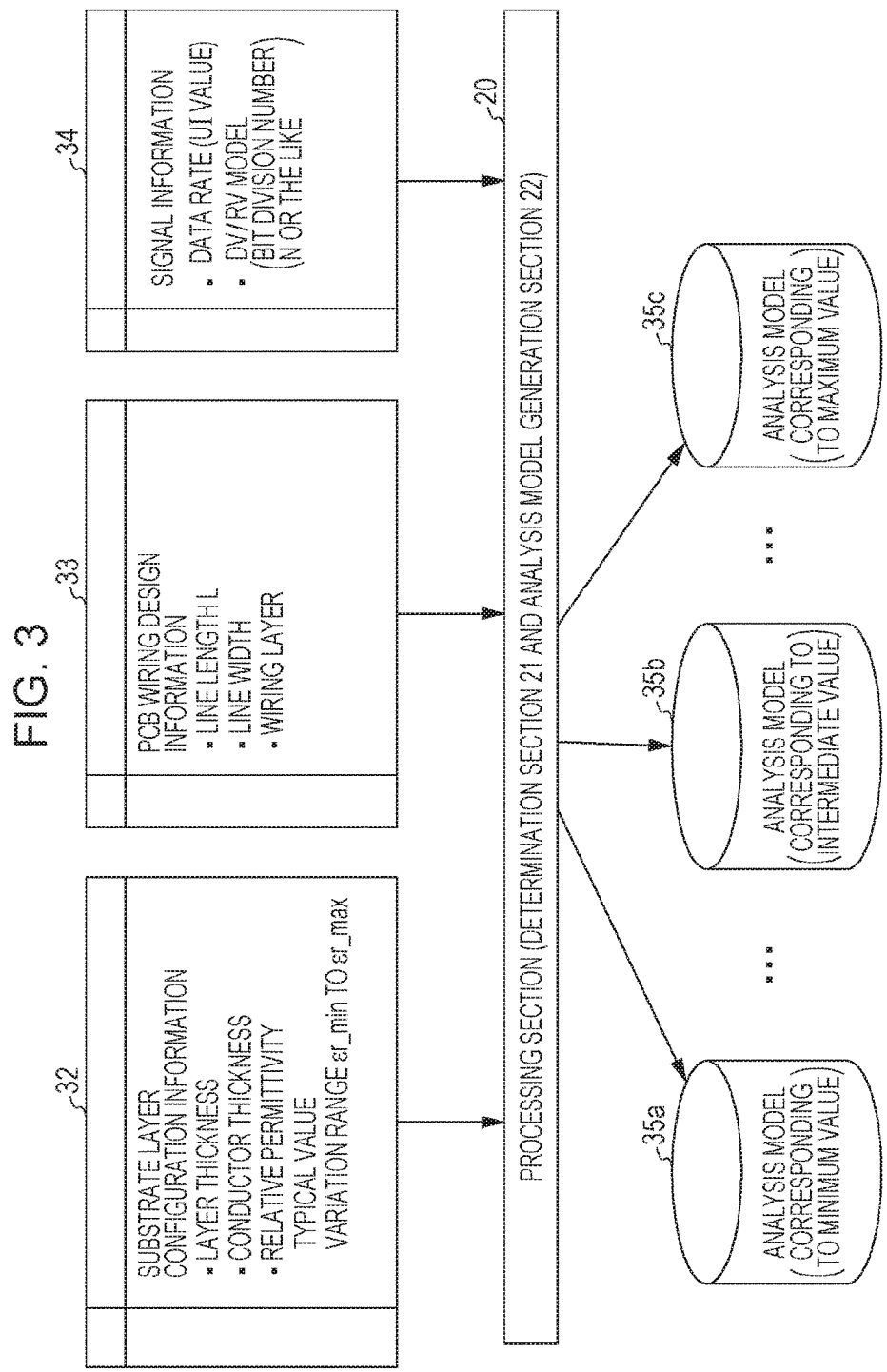
FIG. 3 is a block diagram illustrating a functional configuration pertaining to an analysis model generation function according to the embodiment.

Subsequently, a functional configuration of the information processing device (computer) 10 which has the waveform verification function according to the embodiment will be described with reference to FIGS. 1 and 3. FIG. 1 is a block diagram illustrating an example of the functional configuration and FIG. 3 is a block diagram illustrating an example of a functional configuration pertaining to an analysis model generation function according to the embodiment.

The computer 10 has a function of verifying the quality of a signal waveform which is propagated in the focused wiring on the substrate. For this reason, the computer 10 has functions as at least a processing section 20, a storage section 30, an input section 40 and a display section 50 as illustrated in FIG. 1.

The processing section 20 is, for example, the processor 11 as illustrated in FIG. 2. The processing section 20 performs functions as a variation range division position determination section 21, an analysis model generation section 22, a waveform analysis section 23, a display control section 24, and a quality judgment section 25, which will be described later, by executing the waveform verification program 31.

The storage section 30 is, for example, the RAM 12 and the HDD 13 as illustrated in FIG. 2, and stores various pieces of information for realizing the waveform verification function, that is, various pieces of information which are used to verify the quality of the signal waveform. The various pieces of information includes substrate layer configuration information 32, PCB wiring design information 33, signal information 34, and an analysis model 35 in addition to the above-described waveform verification program 31.

The substrate layer configuration information 32 is information relevant to a layer configuration of the substrate (PCB) which includes the focused wiring of the waveform verification target. The substrate layer configuration information 32 includes, for example, information relevant to a layer thickness, a conductor thickness, a relative permittivity, and the like as illustrated in FIG. 3. The relative permittivity includes information relevant to a variation range (minimum value $\in$r_min to maximum value $\in$r_max) in addition to a typical value.

The PCB wiring design information 33 is information relevant to the design of the wiring in the substrate (PCB) which includes the focused wiring of the waveform verification target. The wiring design information 33 includes, for example, information relevant to a line length L, a line width, and a wiring layer of each wiring which is the waveform verification target in the substrate, as illustrated in FIG. 3.

The signal information 34 is information relevant to an electrical signal which is propagated through the focused wiring of the waveform verification target on the substrate. The signal information 34 includes, for example, data rate information which includes an UI value (bit width) of a signal, and information relevant to DV/RV model information or the like which includes the number N of divisions performed on the bits (the number of divisions performed on the UI width) when the waveform analysis is performed, as illustrated in FIG. 3.

The analysis model 35 is generated by the analysis model generate function (functions as the analysis model generation section 21 and the analysis model generation section 22 which will be described later) of the processing section 20. The analysis model 35 includes, for example, an analysis model (corresponding to the minimum value) 35a, an analysis model (corresponding to the intermediate value) 35b, and an analysis model (corresponding to the maximum value) 35c, as illustrated in FIG. 3.

The analysis model (corresponding to the minimum value) 35a is generated to correspond to a minimum value $\in$r_min (=$\in$r(0)) of the relative permittivity. The analysis model (corresponding to the intermediate value) 35b is generated to correspond to an intermediate value $\in$r(n+1) of the relative permittivity which is determined based on equations (8) and (9). The analysis model (corresponding to the maximum value) 35c is generated to correspond to a maximum value $\in$r_max of the relative permittivity. Specifically, the analysis model (corresponding to the maximum value) 35c according to the embodiment is generated to correspond to the relative permittivity $\in$r(n+1), which is acquired at a point of time in which the intermediate value $\in$r(n+1) determined based on equation (8) is equal to or greater than the maximum value $\in$r_max, as will be described later.

The input section 40 is, for example, the keyboard 15a and the mouse 15b as illustrated in FIG. 2, is operated by the user, and performs various instructions, such as instruction of the focused wiring which is the waveform verification target on the substrate, pertaining to the waveform verification. Meanwhile, instead of the mouse 15b, a touch panel, a tablet, a touch pad, a track ball, and the like may be used.

The display section 50 is, for example, the monitor 14a as illustrated in FIG. 2, and displays an eye pattern which is acquired through the waveform analysis when, for example, the user judges the quality of the signal waveform with reference to the display of the display section 50 according to the embodiment (refer to FIGS. 8C, 12, 13A, and 13B).

The waveform verification program 31 causes the processing section 20 (processor 11) to perform the functions as the variation range division position determination section 21, the analysis model generation section 22, the waveform analysis section 23, the display control section 24, and the quality judgment section 25, which will be described later as described above.

Subsequently, the functions as the variation range division position determination section 21, the analysis model generation section 22, the waveform analysis section 23, the display control section 24, and the quality judgment section 25 which are realized by the processing section 20 (processor 11) will be described.

The variation range division position determination section (determination unit) 21 determines a value of the relative permittivity $\in$r in a division position (analysis notch) of the variation range of the relative permittivity $\in$r such that division is performed on the variation range of the propagation delay time Td of the signal waveform corresponding to the variation range of the relative permittivity $\in$r of the substrate at even intervals. More specifically, when it is assumed that a relative permittivity in an n-th division position (variation case) is $\in$r(n), the determination section 21 determines relative permittivities $\in$r(0) and $\in$r(n+1) in 0-th and (n+1)-th division positions based on equations (9) and (8), respectively.

In addition, in a case in which the relative permittivity $\in$r(n+1) in the (n+1)-th division position is equal to or greater than the maximum value $\in$r_max of the variation range of the relative permittivity $\in$r, the determination section 21 ends determination of the relative permittivity $\in$r(n+1) based on equation (8) at that point of time. That is, in the embodiment, at a point of time in which the relative permittivity $\in$r(n+1), which is determined based on equation (8), is equal to or greater than the maximum value $\in$r_max, the relative permittivity $\in$r(n+1) is regarded as the maximum value $\in$r_max of the variation range of the relative permittivity $\in$r, and the division position determination process ends.

The analysis model generation section 22 generates analysis models corresponding to the relative permittivity $\in$r in the division positions (variation cases) which are determined by the determination section 21. The generated analysis models are stored in the storage section 30 as the analysis model (corresponding to the minimum value) 35a, the analysis model (corresponding to the intermediate value) 35b, and the analysis model (corresponding to the maximum value) 35c, as illustrated in FIG. 3.

At this time, as described above, the analysis model (corresponding to the minimum value) 35a is generated to correspond to the minimum value $\in$r_min(=$\in$r(0)) of the relative permittivity. The analysis model (corresponding to the intermediate value) 35b is generated to correspond to the intermediate values $\in$r(1) to $\in$r(n) of the variation range of the relative permittivity which is determined based on equations (8) and (9). The analysis model (corresponding to the maximum value) 35c is generated to correspond to the maximum value $\in$r_max(=$\in$r(n+1)) of the relative permittivity.

The waveform analysis section 23 performs the waveform analysis (transition analysis) on the signal waveforms using the respective analysis models which are generated by the analysis model generation section 22. At this time, the waveform analysis section 23 generates eye patterns through the waveform analysis performed on the signal waveforms for the respective analysis models.

The display control section 24 causes the display section 50 to display various pieces of information to provide the various pieces of information to the user by controlling the display state of the display section 50. Specifically, the display control section 24 according to the embodiment controls the display state of the display section 50 such that the eye patterns, which are generated for the respective analysis models by the waveform analysis section 23, are displayed on the display section 50 (refer to FIGS. 8C, 12, 13A, and 13B). Therefore, the user can judge the qualities of the signal waveforms by sight by referring to the eye patterns which are displayed on the display section 50.

The quality judgment section 25 automatically judges the qualities of the signal waveforms for the respective analysis models based on the opening voltages of the eye patterns which are generated for the respective analysis models by the waveform analysis section 23. As described above with reference to FIG. 8C, in a case in which the opening voltage is high, it is possible to judge that the quality of the signal waveform of the judgment target is excellent. In contrast, in a case in which the opening voltage is low, it is possible to judge that the quality of the signal waveform of the judgment target is bad. Here, for example, a judgment threshold is set in advance. In a case in which the opening voltage is lower than the judgment threshold, the quality judgment section 25 is configured to judge that the quality of the signal waveform of the judgment target is bad.

Meanwhile, the quality judgment section 25 may be provided in a case in which the quality of the signal waveform is automatically judged, and may be omitted in a case in which the quality of the signal waveform is judged by only the sight of the user. In addition, configuration may be made such that one of the judgment by the sight of the user and the automatic judgment performed by the quality judgment section 25 is selectively performed by being switched or both the judgments can be performed.

Figure 4:
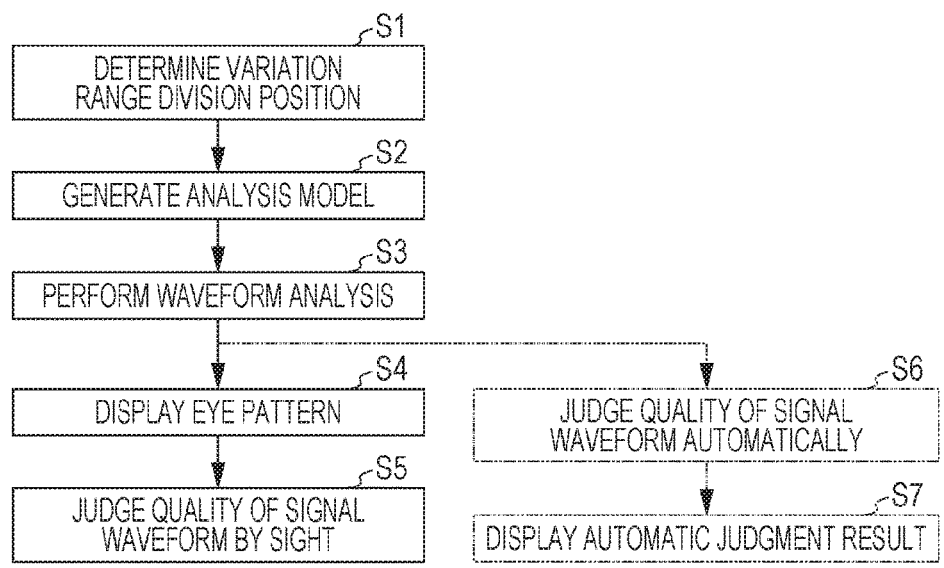
FIG. 4 is a flowchart illustrating a waveform verification operation according to the embodiment.
Figure 5:
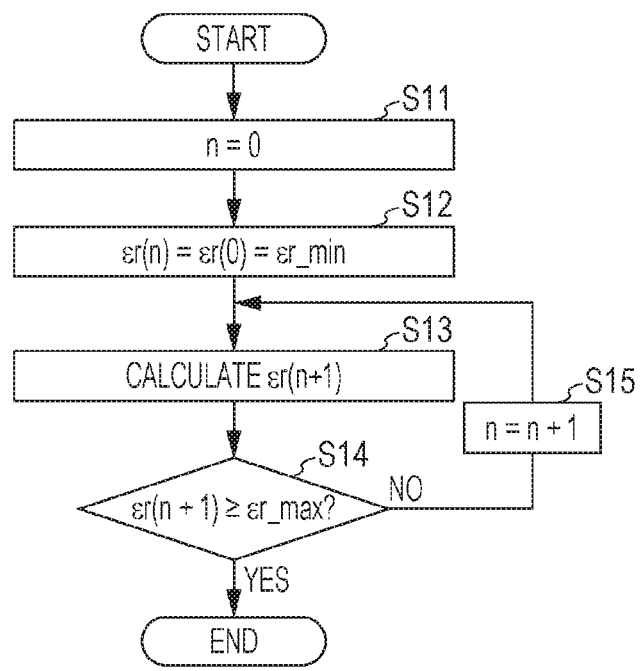
FIG. 5 is a flowchart illustrating an operation of determining a division position of a variation range according to the embodiment.

Subsequently, the waveform verification operation performed by the information processing device 10 according to the embodiment will be described in detail with reference to FIGS. 4 and 5.

First, the waveform verification operation according to the embodiment will be described according to a flowchart (steps S1 to S7) illustrated in FIG. 4.

In step S1, the determination section 21 determines a value of the relative permittivity $\in r$ in the division position (analysis notch) of the variation range of the relative permittivity $\in r$ such that division is performed on the variation range of the propagation delay time Td of the signal waveform corresponding to the variation range of the relative permittivity $\in r$ of the substrate at even intervals. The division position determination operation in step S1 will be described later in detail with reference to FIG. 5.

Further, in step S2, the analysis model generation section 22 generates the analysis models 35a to 35c corresponding to the relative permittivity $\in r$ in the respective division positions (variation cases) which are determined by the determination section 21, and stores the generated analysis models 35a to 35c in the storage section 30.

Thereafter, in step S3, the waveform analysis section 23 performs the waveform analysis (transition analysis) on the signal waveforms using the respective analysis models which are generated by the analysis model generation section 22, and generates the eye patterns for the respective analysis models.

In a case in which the qualities of the signal waveforms are judged by the sight of the user, the display control section 24 displays the eye patterns which are generated for the respective analysis models by the waveform analysis section 23 on the display section 50 in step S4. Further, the user judges the qualities of the signal waveforms by sight by referring to the eye patterns displayed on the display section 50 (step S5).

In contrast, in a case in which the qualities of the signal waveforms are automatically judged, the quality judgment section 25 automatically judges the qualities of the signal waveforms for the respective analysis models by comparing the opening voltages (potential differences) of the eye patterns which are generated for the respective analysis models by the waveform analysis section 23 with a judgment threshold which is set in advance in step S6. For example, in a case in which the opening voltage is lower than the judgment threshold, the quality judgment section 25 judges that the quality of the signal waveform of the judgment target is bad. Further, the display control section 24 displays the result of the automatic judgment performed by the quality judgment section 25 on the display section 50 (step S7).

Subsequently, a variation range division position (analysis notch) determination operation according to the embodiment will be described according to the flowchart (steps S11 to S15) illustrated in FIG. 5. The determination operation corresponds to the operation which is performed by the determination section 21 based on equations (9) and (8) in step S1 of FIG. 4.

First, the determination section 21 sets a parameter n to 0 (step S11), and sets n=0, that is, the relative permittivity $\in r(0)$ of a 0-th variation case to the minimum value $\in r\_min$ of the variation range of the relative permittivity of the substrate as in equation (9) (step S12).

Hereinafter, the determination section 21 determines the relative permittivity $\in r(n+1)$ of the (n+1)-th variation case by substituting the relative permittivity $\in r(n)$ of the n-th variation case for equation (8) (step S13).

Further, the determination section 21 judges whether or not the relative permittivity $\in r(n+1)$ determined in step S13 is equal to or greater than the maximum value $\in r\_max$ of the variation range of the relative permittivity $\in r$ (step S14). In a case in which the $\in r(n+1)$ is smaller than $\in r\_max$ (NO route in step S14), the determination section 21 increases n by 1 (step S15), and returns to the process in step S13.

In contrast, in a case in which $\in r(n+1)$ is equal to or greater than $\in r\_max$ (YES route in step S14), the determination section 21 determines the relative permittivity $\in r(n+1)$, which is finally determined in step S13, as the maximum value $\in r\_max$ of the variation range of the relative permittivity $\in r$, and ends the determination operation based on equation (8).

As described above, in the information processing device 10 according to the embodiment, the delay difference is calculated based on the line length L of the focused wiring and the variation in the relative permittivity $\in r$, and the fineness of the division (notch) performed on the variation range of the relative permittivity $\in r$ is automatically determined based on the data rate (bit width UI), thereby automatically generating variation models.

Specifically, in the embodiment, the relative permittivities $\in r(0)$ to $\in r(n+1)$ of the 0-th to (n+1)-th variation cases are determined based on equations (9) and (8). Accordingly, as illustrated in FIG. 7, the variation range of the propagation delay time Td of the signal waveform, which corresponds to the variation range of the relative permittivity $\in r$ of the substrate, is divided at even time intervals. That is, in the embodiment, the variation range of the relative permittivity ∈r of the substrate is not simply divided at even intervals based on the relative permittivity, and the variation range of the relative permittivity ∈r of the substrate is divided such that the variation range of the propagation delay time Td of the signal waveform is divided at even time intervals.

Therefore, in the embodiment, it is possible to generate a variation analysis case, in which verification omission does not occur as far as possible, without the excessive precision in which the delay difference (notch) due to the substrate delay variation exceeds the analysis precision (analysis notch) when the waveform analysis is performed.

Therefore, it is possible to verify the quality of the signal waveform deterioration case caused by the substrate production variation without omission, with the result that device design is performed without verification omission, and thus it is possible to securely suppress failures from occurring in the actual machine caused by verification omission. As described above, according to the embodiment, a technology for verifying the quality of the received waveform according to the substrate production variation is realized using the high-speed digital signal transmission simulation.

Hereinabove, although preferable embodiments have been described in detail, the embodiments are not limited to the relevant specific embodiment, and various modifications and changes are possible without departing from the gist of the embodiment.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory, computer-readable recording medium which stores a waveform verification program that causes a memory and one or more processors, which are coupled to the memory and configured to verify a quality of a signal waveform that is propagated through focused wiring on a substrate, to perform a process comprising:
   determining a relative permittivity of the substrate in a division position of a variation range of the relative permittivity of the substrate such that a variation range of a propagation delay time of the signal waveform corresponding to the variation range of the relative permittivity of the substrate is divided at even intervals;
   generating an analysis model corresponding to the relative permittivity of the substrate in the determined division position;
   performing waveform analysis on the signal waveform using the generated analysis model; and
   generating an eye pattern according to the waveform analysis performed on the signal waveform for each analysis model.

2. The computer-readable recording medium which stores a waveform verification program according to claim 1, wherein, if it is assumed that the relative permittivity of the substrate in an n-th (n is an integer which is equal to or greater than 0) division position is ∈r(n), the waveform verification program causes the computer to perform a process including
respectively determining the relative permittivities ∈r(0) and ∈r(n+1) of the substrate in 0-th and (n+1)-th division positions by equations ∈r(0)=∈r_min and $$\varepsilon r(n+1) = \left( \frac{UI}{N \times L \sqrt{\mu_0 \varepsilon_0}} + \sqrt{\varepsilon r(n)} \right)^2,$$

where, ∈r_min is a minimum value of the variation range of the relative permittivity of the substrate, L is a wiring length of the focused wiring, a Unit Interval (UI) is a time of one bit length of a data signal (inverse number of a bit rate), N is the number of divisions performed on bits in a case of the waveform analysis, $\mu_0$ is a vacuum magnetic permeability, and $\varepsilon_0$ is a vacuum permeability.

3. The computer-readable recording medium which stores a waveform verification program according to claim 2,
   wherein the waveform verification program causes the computer to perform a process including
   ending determination of the relative permittivity based on equations ∈r(0)=∈r_min and $$\varepsilon r(n+1) = \left( \frac{UI}{N \times L \sqrt{\mu_0 \varepsilon_0}} + \sqrt{\varepsilon r(n)} \right)^2,$$

at a point in time at which the relative permittivity ∈r(n+1) of the substrate in the (n+1)-th division position is equal to or greater than the maximum value of the substrate relative permittivity variation range.

4. The computer-readable recording medium which stores a waveform verification program according to claim 1,
   wherein the waveform verification program causes the computer to perform a process including
   displaying the generated eye pattern on a display section.

5. The computer-readable recording medium which stores a waveform verification program according to claim 1,
   wherein the waveform verification program causes the computer to perform a process including
   judging the quality of the signal waveform based on the generated eye pattern.

6. An information processing device comprising:
   a memory; and
   one or more processors which are coupled to the memory,
   wherein the one or more processors performs a process including
   verifying a quality of a signal waveform that is propagated through focused wiring on a substrate; and
   storing information which is used for the verification of the quality of the signal waveform, and
   wherein the verifying includes
   determining a relative permittivity of the substrate in a division position of a variation range of the relative permittivity of the substrate such that a variation range of a propagation delay time of the signal waveform corresponding to the variation range of the relative permittivity of the substrate is divided at even intervals;
   generating an analysis model corresponding to the relative permittivity of the substrate in the determined division position;
   performing waveform analysis on the signal waveform using the generated analysis model; and generating an eye pattern according to the waveform analysis performed on the signal waveform for each analysis model.

7. The information processing device according to claim 6,
wherein, if it is assumed that the relative permittivity of the substrate in an n-th (n is an integer which is equal to or greater than 0) division position is ∈r(n), the verifying includes
respectively determining the relative permittivities ∈r(0) and ∈r(n+1) of the substrate in 0-th and (n+1)-th division positions by equations ∈r(0)=∈r_min and $$\varepsilon r(n+1) = \left(\frac{UI}{N \times L\sqrt{\mu_0 \varepsilon_0}} + \sqrt{\varepsilon r(n)}\right)^2,$$

where, ∈r_min is a minimum value of the variation range of the relative permittivity of the substrate, L is a wiring length of the focused wiring, a Unit Interval (UI) is a time of one bit length of a data signal (inverse number of a bit rate), N is the number of divisions performed on bits in a case of the waveform analysis, $\mu_0$ is a vacuum magnetic permeability, and $\in_0$ is a vacuum permeability.

8. The information processing device according to claim 7,
wherein the verifying includes
ending determination of the relative permittivity based on equation (13) at a point of time in which the relative permittivity ∈r(n+1) of the substrate in the (n+1)-th division position is equal to or greater than the maximum value of the substrate relative permittivity variation range.

9. The information processing device according to claim 6,
wherein the verifying includes
displaying the generated eye pattern on a display.

10. The information processing device according to claim 6,
wherein the verifying includes
judging the quality of the signal waveform based on the generated eye pattern.

11. A waveform verification method for causing a computer to verify a quality of a signal waveform that is propagated through focused wiring on a substrate, the waveform verification method comprising:
determining a relative permittivity of the substrate in a division position of a variation range of the relative permittivity of the substrate such that a variation range of a propagation delay time of the signal waveform corresponding to the variation range of the relative permittivity of the substrate is divided at even intervals;

generating an analysis model corresponding to the relative permittivity of the substrate in the determined division position; and
performing waveform analysis on the signal waveform using the generated analysis model; and
generating an eye pattern according to the waveform analysis performed on the signal waveform for each analysis model.

12. The waveform verification method according to claim 11, wherein, if it is assumed that the relative permittivity of the substrate in an n-th (n is an integer which is equal to or greater than 0) division position is ∈r(n), the relative permittivities ∈r(0) and ∈r(n+1) of the substrate in 0-th and (n+1)-th division positions are determined by equations ∈r(0)=∈r_min and $$\varepsilon r(n+1) = \left(\frac{UI}{N \times L\sqrt{\mu_0 \varepsilon_0}} + \sqrt{\varepsilon r(n)}\right)^2,$$

where, ∈r_min is a minimum value of the variation range of the relative permittivity of the substrate, L is a wiring length of the focused wiring, a Unit Interval (UI) is a time of one bit length of a data signal (inverse number of a bit rate), N is the number of divisions performed on bits in a case of the waveform analysis, $\mu_0$ is a vacuum magnetic permeability, and $\in_0$ is a vacuum permeability.

13. The waveform verification method according to claim 12,
wherein the determination of the relative permittivity based on equations ∈r(0)=∈r_min and $$\varepsilon r(n+1) = \left(\frac{UI}{N \times L\sqrt{\mu_0 \varepsilon_0}} + \sqrt{\varepsilon r(n)}\right)^2,$$

ends at a point in time at which the relative permittivity ∈r(n+1) of the substrate in the (n+1)-th division position is equal to or greater than the maximum value of the substrate relative permittivity variation range.

14. The waveform verification method according to claim 11,
wherein the generated eye pattern is displayed on a display.

15. The waveform verification method according to claim 11,
wherein the quality of the signal waveform is judged based on the generated eye pattern.

* * * * *